United States Patent
Su et al.

(10) Patent No.: US 10,623,836 B2
(45) Date of Patent: Apr. 14, 2020

(54) SERVICE TRANSMISSION METHOD AND FIRST TRANSMISSION DEVICE

(71) Applicant: HUAWEI TECHNOLOGIES CO., LTD., Shenzhen, Guangdong (CN)

(72) Inventors: Wei Su, Chengdu (CN); Qiuyou Wu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/200,922

(22) Filed: Nov. 27, 2018

(65) Prior Publication Data

US 2019/0098381 A1    Mar. 28, 2019

Related U.S. Application Data

(63) Continuation of application No. PCT/CN2016/083757, filed on May 27, 2016.

(51) Int. Cl.
*H04Q 11/00* (2006.01)
*H04J 14/02* (2006.01)
(Continued)

(52) U.S. Cl.
CPC ........ *H04Q 11/0062* (2013.01); *H04J 3/1658* (2013.01); *H04J 14/02* (2013.01);
(Continued)

(58) Field of Classification Search
CPC .. H04J 3/1658; H04J 14/02; H04J 2203/0085; H04J 2203/0091; H04L 12/413; H04Q 11/0062; H04Q 2011/0086
See application file for complete search history.

(56) References Cited

U.S. PATENT DOCUMENTS 10,382,167 B2 * 8/2019 Gareau .................. H04L 1/007
2010/0040370 A1   2/2010 Aoki et al.
(Continued)

FOREIGN PATENT DOCUMENTS

CN     101217334 A    7/2008
CN     101267386 A    9/2008
(Continued)

OTHER PUBLICATIONS

International Search Report and Written Opinion issued in International Application No. PCT/CN2016/083757 dated Jan. 26, 2017, 15 pages.
(Continued)

*Primary Examiner* — Mina M Shalaby
(74) *Attorney, Agent, or Firm* — Fish & Richardson P.C.

(57) ABSTRACT

A service transmission method and a transmission device are disclosed. The method includes: mapping n client signals with a rate of t to ms/t load subareas of m lanes of flexible optical transport network (FlexO) frames, where a payload area of each of the m lanes of FlexO frames is divided into s/t load subareas, and each lane is transmitted using a FlexO lane with a transmission rate of s; configuring a FlexO type, timeslot overhead, and signal mapping information for each lane; and transmitting the m lanes of FlexO frames to a second transmission device by using m FlexO lanes with the transmission rate of s. The second transmission device is configured to parse, according to the FlexO type, the timeslot overhead, and the signal mapping information, the client signals carried in the ms/t load subareas.

20 Claims, 15 Drawing Sheets

(51) Int. Cl.
*H04J 3/16* (2006.01)
*H04L 12/413* (2006.01)

(52) U.S. Cl.
CPC .... *H04L 12/413* (2013.01); *H04J 2203/0085* (2013.01); *H04J 2203/0091* (2013.01); *H04Q 2011/0086* (2013.01)

(56) References Cited

U.S. PATENT DOCUMENTS

| | | | |
|---|---|---|---|
| 2010/0046951 A1 | 2/2010 | Dong et al. | |
| 2010/0226652 A1 | 9/2010 | Vissers et al. | |
| 2011/0044686 A1 | 2/2011 | Wu et al. | |
| 2012/0039609 A1 | 2/2012 | Dong et al. | |
| 2013/0250974 A1 | 9/2013 | Yin | |
| 2015/0139650 A1 | 5/2015 | Su et al. | |
| 2016/0006545 A1 | 1/2016 | Fu et al. | |
| 2016/0056886 A1 | 2/2016 | Kitamura et al. | |
| 2016/0056914 A1 | 2/2016 | Gareau et al. | |
| 2016/0119075 A1 | 4/2016 | Gareau et al. | |
| 2016/0119076 A1* | 4/2016 | Gareau | H04L 12/66 398/49 |
| 2016/0191277 A1 | 6/2016 | Li et al. | |
| 2017/0005742 A1* | 1/2017 | Gareau | H04J 3/1611 |
| 2017/0005901 A1* | 1/2017 | Gareau | H04L 43/10 |
| 2017/0005949 A1* | 1/2017 | Gareau | H04L 69/28 |
| 2017/0006360 A1* | 1/2017 | Gareau | G06F 13/40 |
| 2017/0012726 A1 | 1/2017 | Konishi et al. | |
| 2017/0093757 A1* | 3/2017 | Gareau | H04L 49/35 |
| 2018/0102834 A1* | 4/2018 | Ibach | H04B 10/03 |
| 2018/0167160 A1* | 6/2018 | Gareau | H04L 1/007 |
| 2018/0264866 A1* | 9/2018 | Raymond | H04N 1/46 |
| 2019/0098381 A1* | 3/2019 | Su | H04J 3/1658 |

FOREIGN PATENT DOCUMENTS

| | | |
|---|---|---|
| CN | 101291179 A | 10/2008 |
| CN | 101378399 A | 3/2009 |
| CN | 101547055 A | 9/2009 |
| CN | 101827285 A | 9/2010 |
| CN | 104350716 A | 2/2015 |
| CN | 104426631 A | 3/2015 |
| JP | 2010114691 A | 5/2010 |
| JP | 2012004839 A | 1/2012 |
| JP | 2013255286 A | 12/2013 |
| JP | 2014132746 | 7/2014 |
| RU | 2439708 C2 | 9/2010 |
| WO | 2014019359 A1 | 2/2014 |
| WO | 2015032259 A1 | 3/2015 |
| WO | 2015133169 | 9/2015 |

OTHER PUBLICATIONS

Extended European Search Report issued in European Application No. 16902746.3 dated Apr. 15, 2019, 6 pages.
Gareau, "G.709.1 Draft Text v0.11;CD11—F01," vol. 11/15, May 2, 2016, XP044178936, 24 pages.
Chinese Office Action issued in Chinese Application No. 201680078291.3 dated Mar. 4, 2019, 5 pages.
Office Action issued in Russian Application No. 2018145955107 dated May 20, 2019, 25 pages (partial English translation).
Office Action issued in Japanese Application No. 2018-561975 dated Feb. 17, 2020, 5 pages (with English translation).
Office Action issued in Chinese Application No. 201910683242.8 dated Mar. 2, 2020, 7 pages.

* cited by examiner

| Byte<br>Frame | 1 | 2 | 3 | 4 | 5 | 6 | 7 8 9 10 | 11 12 13 ... 26 | 27 28 | 29 30 31 ... 36 ... 40 |
|---|---|---|---|---|---|---|---|---|---|---|
| 0 | MFAS | STAT | GID | GID | GID | FOGT | PID | MAP | CRC | FCC | OSMC | Client timeslot | MOH | RES |
| 1 | MFAS | STAT | AVAIL | | | RES | | MAP | CRC | FCC | OSMC | Client timeslot | MOH | |
| 2 | MFAS | STAT | | | | | | MAP | CRC | FCC | OSMC | | | |
| 3 | MFAS | STAT | | | | | | MAP | CRC | FCC | OSMC | | | |
| 4 | MFAS | STAT | | | | | | MAP | CRC | FCC | OSMC | | | |
| 5 | MFAS | STAT | | | | | | MAP | CRC | FCC | OSMC | | | |
| 6 | MFAS | STAT | | | | | | MAP | CRC | FCC | OSMC | | | |
| 7 | MFAS | STAT | | | | | | MAP | CRC | FCC | OSMC | | | |

FIG. 5

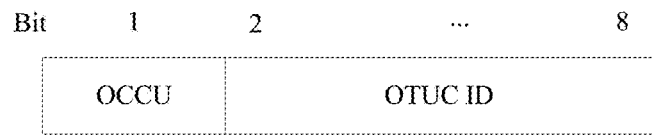
FIG. 7
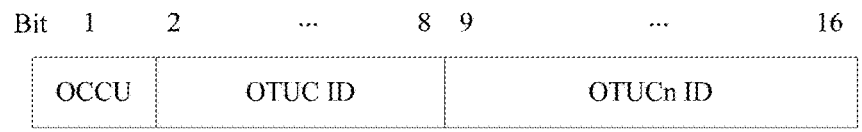
FIG. 8
| MFAS | Client timeslot and MOH overhead distribution | | | |
|---|---|---|---|---|
| | 100 G | 200 G | 400 G | 600 G |
| 0 | --- | Load subarea #1 | Load subarea #1 | Load subarea #1 |
| 1 | --- | Load subarea #2 | Load subarea #2 | Load subarea #2 |
| 2 | --- | --- | Load subarea #3 | Load subarea #3 |
| 3 | --- | --- | Load subarea #4 | Load subarea #4 |
| 4 | --- | --- | --- | Load subarea #5 |
| 5 | --- | --- | --- | Load subarea #6 |
| 6 | --- | --- | --- | --- |
| 7 | --- | --- | --- | --- |
FIG. 9

| | | Client timeslot overheads | | | MOH overheads |
|---|---|---|---|---|---|
| | | OCCU | OTUC ID | OTUCn ID | |
| FlexO frame #1 | Load subarea #1 | 1 | x1 | OTUC5 | Padding 0 |
| | Load subarea #2 | 1 | x2 | OTUC5 | Padding 0 |
| FlexO frame #2 | Load subarea #1 | 1 | x3 | OTUC5 | Padding 0 |
| | Load subarea #2 | 1 | x4 | OTUC5 | Padding 0 |
| FlexO frame #3 | Load subarea #1 | 1 | x5 | OTUC5 | OTUC5 mapping overhead information |
| | Load subarea #2 | 1 | y1 | OTUC3 | Padding 0 |
| FlexO frame #4 | Load subarea #1 | 1 | y2 | OTUC3 | Padding 0 |
| | Load subarea #2 | 1 | y3 | OTUC3 | OTUC3 mapping overhead information |

FIG. 12

SERVICE TRANSMISSION METHOD AND FIRST TRANSMISSION DEVICE

CROSS-REFERENCE TO RELATED APPLICATIONS

This application is a continuation of International Application No. PCT/CN2016/083757, filed on May 27, 2016. The disclosure of the aforementioned application is hereby incorporated by reference in its entirety.

TECHNICAL FIELD

The present invention relates to the field of communications technologies, and in particular, to a service transmission method and a first transmission device.

BACKGROUND

An Optical transport network (OTN) is a core technology in a transport network. The OTN has a great Operation Administration and Maintenance (OAM) capability, a strong Tandem Connection Monitoring (TCM) capability, and an out-of-band Forward Error Correction (FEC) capability, and can implement flexible grooming and management of a large-capacity service.

With the growth and diversification of service traffic, an OTN with a fixed-rate interface can no longer meet an interconnection requirement. Currently, the International Telecommunication Union—Telecommunication Standardization Sector ITU-T) is formulating an n×100 G Flexible OTN (FlexO) group interface. Based on n 100 G optical modules, the FlexO group interface provides a flexible-rate interface to carry a signal of an Optical Transport Unit-Cn (OTUCn), so as to implement an interconnection between OTUCn signal inter-domain interfaces. The n×100 G FlexO group interface includes n 100 G FlexO lanes, and a rate of each FlexO lane is equal to an OTU4 rate. In this case, each 100 G FlexO lane can directly use a standard and low-cost 100 G optical module (such as CFP4 or QSFP28) for sending. As shown in FIG. 1, an OTUCn is first divided into n OTUC client signals, and the n OTUC client signals are marked as #1, . . . , and #n; a one-to-one correspondence is established between the n OTUC client signals and n lanes of FlexO frame signals (the OTUC client signals #1, . . . , and #n are respectively and synchronously mapped to payload areas of FlexO frames #1, . . . , and #n); a physical channel identifier (PID) of FlexO frame overheads is used to indicate a location of a current FlexO lane in a FlexO group, and correspondingly, a location, in an OTUCn, of an OTUC client signal carried in the current FlexO lane can be obtained (an OTUC instance in the diagram is an OTUC client signal). FIG. 2 shows a corresponding frame structure.

A defect in the prior art is that, a service cannot be flexibly transmitted due to one-to-one mapping between the n OTUC client signals and the n lanes of FlexO frames.

SUMMARY

Embodiments of the present invention disclose a service transmission method and a first transmission device, so as to flexibly transmit a service.

According to a first aspect, an embodiment of the present invention provides a service transmission method, and the method includes:

mapping, by a first transmission device, n client signals with a rate of t to ms/t load subareas of m lanes of FlexO frames, where each client signal is mapped to one load subarea, a payload area of each of the m lanes of FlexO frames is divided into s/t load subareas, and each lane of FlexO frame is transmitted by using a FlexO lane with a transmission rate of s, where s, t, m, and s/t are all positive integers;

configuring, by the first transmission device, FlexO type information, timeslot overhead information, and signal mapping information for each lane of FlexO frame, where the FlexO type information is used to indicate a FlexO group interface type, and the FlexO group interface type indicates the transmission rate of the FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame; and transmitting, by the first transmission device, the m lanes of FlexO frames to a second transmission device by using m FlexO lanes with the transmission rate of s.

By performing the foregoing steps, the first transmission device configures each of different load subareas of a payload area of a FlexO frame to carry one client signal, and can flexibly configure, according to a requirement, a specific load subarea for carrying a specific client signal, thereby improving service transmission flexibility.

With reference to the first aspect, in a possible implementation of the first aspect, the second transmission device is configured to parse, according to the FlexO type information, the timeslot overhead information, and the signal mapping information, the client signals carried in the ms/t load subareas.

With reference to the first aspect or the possible implementation of the first aspect, in a second possible implementation of the first aspect, the method further includes:

when n<ms/t, filling a replacement signal in a load subarea that is in the ms/t load subareas and to which no client signal is mapped.

With reference to the first aspect, the first possible implementation of the first aspect, or the second possible implementation of the first aspect, in a third possible implementation of the first aspect, the n client signals with the rate of t include client signals in at least two optical channel transport units, and each optical channel transport unit includes at least one client signal.

With reference to the third possible implementation of the first aspect, in a fourth possible implementation of the first aspect, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

Specifically, the first transmission device enables client signals of optical channel transport units with a plurality of rates to be carried on a same group of FlexO group interfaces, thereby improving flexibility of carrying a client signal in a FlexO frame.

With reference to the third possible implementation of the first aspect or the fourth possible implementation of the first aspect, in a fifth possible implementation of the first aspect, the timeslot overhead information is further used to indicate an optical channel transport unit to which the client signals mapped to the s/t load subareas of each lane of FlexO frame belong.

Specifically, a plurality of load subareas of one lane of FlexO frame can carry client signals of optical channel transport units with a plurality of rates, thereby improving flexibility of carrying a client signal in a FlexO frame.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation of the first aspect, before the transmitting, by the first transmission device, the m lanes of FlexO frames to a second transmission device by using m FlexO lanes with the transmission rate of s, the method further includes:

configuring, by the first transmission device, quantity overhead information for each lane of FlexO frame, where the quantity overhead information is used to indicate a quantity of load subareas that are in the load subareas of each lane of FlexO frame and to which client signals are mapped.

According to a second aspect, an embodiment of the present invention provides a first transmission device, and the first transmission device includes a processor, a memory, and a line board. The memory is configured to store a program, and the processor invokes the program in the memory and is configured to perform the following operations:

mapping n client signals with a rate of t to ms/t load subareas of m lanes of FlexO frames, where each client signal is mapped to one load subarea, a payload area of each of the m lanes of FlexO frames is divided into s/t load subareas, and each lane of FlexO frame is transmitted by using a FlexO lane with a transmission rate of s, where s, t, m, and s/t are all positive integers;

configuring FlexO type information, timeslot overhead information, and signal mapping information for each lane of FlexO frame, where the FlexO type information is used to indicate a FlexO group interface type, and the FlexO group interface type indicates the transmission rate of the FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame; and transmitting the m lanes of FlexO frames to a second transmission device by using m FlexO lanes with the transmission rate of s and by using the line board.

By performing the foregoing operations, the first transmission device configures each of different load subareas of a payload area of a FlexO frame to carry one client signal, and can flexibly configure, according to a requirement, a specific load subarea for carrying a specific client signal, thereby improving service transmission flexibility.

With reference to the second aspect, in a first possible implementation of the second aspect, the second transmission device is configured to parse, according to the FlexO type information, the timeslot overhead information, and the signal mapping information, the client signals carried in the ms/t load subareas.

With reference to the second aspect or the first possible implementation of the second aspect, in a second possible implementation of the second aspect, the processor is further configured to: when n<ms/t, fill a replacement signal in a load subarea that is in the ms/t load subareas and to which no client signal is mapped.

With reference to the second aspect, the first possible implementation of the second aspect, or the second possible implementation of the second aspect, in a third possible implementation of the second aspect, the n client signals with the rate of t include client signals in at least two optical channel transport units, and each optical channel transport unit includes at least one client signal.

Specifically, the first transmission device enables client signals of optical channel transport units with a plurality of rates to be carried on a same group of FlexO group interfaces, thereby improving flexibility of carrying a client signal in a FlexO frame.

With reference to the third possible implementation of the second aspect, in a fourth possible implementation of the second aspect, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

Specifically, a plurality of load subareas of one lane of FlexO frame can carry client signals of optical channel transport units with a plurality of rates, thereby improving flexibility of carrying a client signal in a FlexO frame.

With reference to the third possible implementation of the second aspect or the fourth possible implementation of the second aspect, in a fifth possible implementation of the second aspect, the timeslot overhead information is further used to indicate an optical channel transport unit to which the client signals mapped to the s/t load subareas of each lane of FlexO frame belong.

With reference to the second aspect, or the first possible implementation of the second aspect, or the second possible implementation of the second aspect, or the third possible implementation of the second aspect, or the fourth possible implementation of the second aspect, or the fifth possible implementation of the second aspect, in a sixth possible implementation of the second aspect, before the transmitting the m lanes of FlexO frames to a second transmission device by using m FlexO lanes with the transmission rate of s and by using the line board, the processor is further configured to:

configure quantity overhead information for each lane of FlexO frame, where the quantity overhead information is used to indicate a quantity of load subareas that are in the load subareas of each lane of FlexO frame and to which client signals are mapped.

According to a third aspect, an embodiment of the present invention provides a first transmission device, and the first transmission device includes functional units for performing all or some steps in the first aspect.

According to a fourth aspect, an embodiment of the present invention provides a service transmission method, and the method includes:

receiving, by a second transmission device, m lanes of FlexO frames sent by a first transmission device by using m FlexO lanes with a transmission rate of s, where each of the m lanes of FlexO frames includes a client signal, FlexO type information, timeslot overhead information, and signal mapping information, where n client signals with a rate of t are mapped to the m lanes of FlexO frames, a payload area of each of the m lanes of FlexO frames is divided into s/t load subareas, and each client signal is mapped to one load subarea; the FlexO type information is used to indicate a FlexO group interface type, and the FlexO group interface type indicates a transmission rate of a FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame, where s, t, m, and s/t are all positive integers; and parsing, by the second transmission device according to the FlexO type information, the timeslot overhead information, and the signal mapping information, the client signals carried in the ms/t load subareas.

By performing the foregoing steps, the first transmission device configures each of different load subareas of a payload area of a FlexO frame to carry one client signal, and can flexibly configure, according to a requirement, a specific load subarea for carrying a specific client signal, thereby improving service transmission flexibility.

With reference to the fourth aspect, in a first possible implementation of the fourth aspect, when n<ms/t, a replacement signal is filled in a load subarea that is in the ms/t load subareas and to which no client signal is mapped.

With reference to the fourth aspect or the first possible implementation of the fourth aspect, in a second possible implementation of the fourth aspect, the n client signals with the rate of t include client signals in at least two optical channel transport units, and each optical channel transport unit includes at least one client signal.

With reference to the second possible implementation of the fourth aspect, in a third possible implementation of the fourth aspect, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

With reference to the second possible implementation of the fourth aspect or the third possible implementation of the fourth aspect, in a fourth possible implementation of the fourth aspect, the timeslot overhead information is further used to indicate an optical channel transport unit to which the client signals mapped to the s/t load subareas of each lane of FlexO frame belong.

According to a fifth aspect, an embodiment of the present invention provides a second transmission device, and the second transmission device includes a processor, a memory, and a line board. The processor invokes a program in the memory and is configured to perform the following operations:

receiving, by using the line board, m lanes of FlexO frames sent by a first transmission device by using m FlexO lanes with a transmission rate of s, where each of the m lanes of FlexO frames includes a client signal, FlexO type information, timeslot overhead information, and signal mapping information, where n client signals with a rate of t are mapped to the m lanes of FlexO frames, a payload area of each of the m lanes of FlexO frames is divided into s/t load subareas, and each client signal is mapped to one load subarea; the FlexO type information is used to indicate a FlexO group interface type, and the FlexO group interface type indicates a transmission rate of a FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame, where s, t, m, and s/t are all positive integers; and parsing, according to the FlexO type information, the timeslot overhead information, and the signal mapping information, the client signals carried in the ms/t load subareas.

By performing the foregoing operations, the first transmission device configures each of different load subareas of a payload area of a FlexO frame to carry one client signal, and can flexibly configure, according to a requirement, a specific load subarea for carrying a specific client signal, thereby improving service transmission flexibility.

With reference to the fifth aspect, in a first possible implementation of the fifth aspect, when n<ms/t, a replacement signal is filled in a load subarea that is in the ms/t load subareas and to which no client signal is mapped.

With reference to the fifth aspect or the first possible implementation of the fifth aspect, in a second possible implementation of the fifth aspect, the n client signals with the rate of t include client signals in at least two optical channel transport units, and each optical channel transport unit includes at least one client signal.

With reference to the second possible implementation of the fifth aspect, in a third possible implementation of the fifth aspect, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

With reference to the second possible implementation of the fifth aspect or the third possible implementation of the fifth aspect, in a fourth possible implementation of the fifth aspect, the timeslot overhead information is further used to indicate an optical channel transport unit to which the client signals mapped to the s/t load subareas of each lane of FlexO frame belong.

According to a sixth aspect, an embodiment of the present invention provides a second transmission device, and the second transmission device includes functional units for performing all or some steps in the fourth aspect.

According to a seventh aspect, an embodiment of the present invention provides a service transmission system, and the system includes a first transmission device and a second transmission device. The first transmission device is the first transmission device described in any implementation of the second aspect or the first transmission device described in the third aspect. The second transmission device is the second transmission device described in any implementation of the fifth aspect or the second transmission device described in the sixth aspect.

According to the embodiments of the present invention, the first transmission device configures each of different load subareas of a payload area of a FlexO frame to carry one client signal, and can flexibly configure, according to a requirement, a specific load subarea for carrying a specific client signal, thereby improving service transmission flexibility.

BRIEF DESCRIPTION OF DRAWINGS

To describe the technical solutions in the embodiments of the present invention more clearly, the following briefly describes the accompanying drawings required for the embodiments.

FIG. 5 is a schematic diagram of overheads of a FlexO frame according to an embodiment of the present invention;

FIG. 7 is a schematic structural diagram of a "client timeslot" field according to an embodiment of the present invention;

FIG. 8 is a schematic structural diagram of a "client timeslot" field according to an embodiment of the present invention;

FIG. 9 is a schematic diagram of a correspondence between overhead indication information and a load subarea according to an embodiment of the present invention;

FIG. 12 is a schematic diagram of a correspondence between each load subarea and each overhead field according to an embodiment of the present invention;

DESCRIPTION OF EMBODIMENTS

The technical solutions according to embodiments of the present invention are clearly described in the following with reference to the accompanying drawings.

Figure 1:
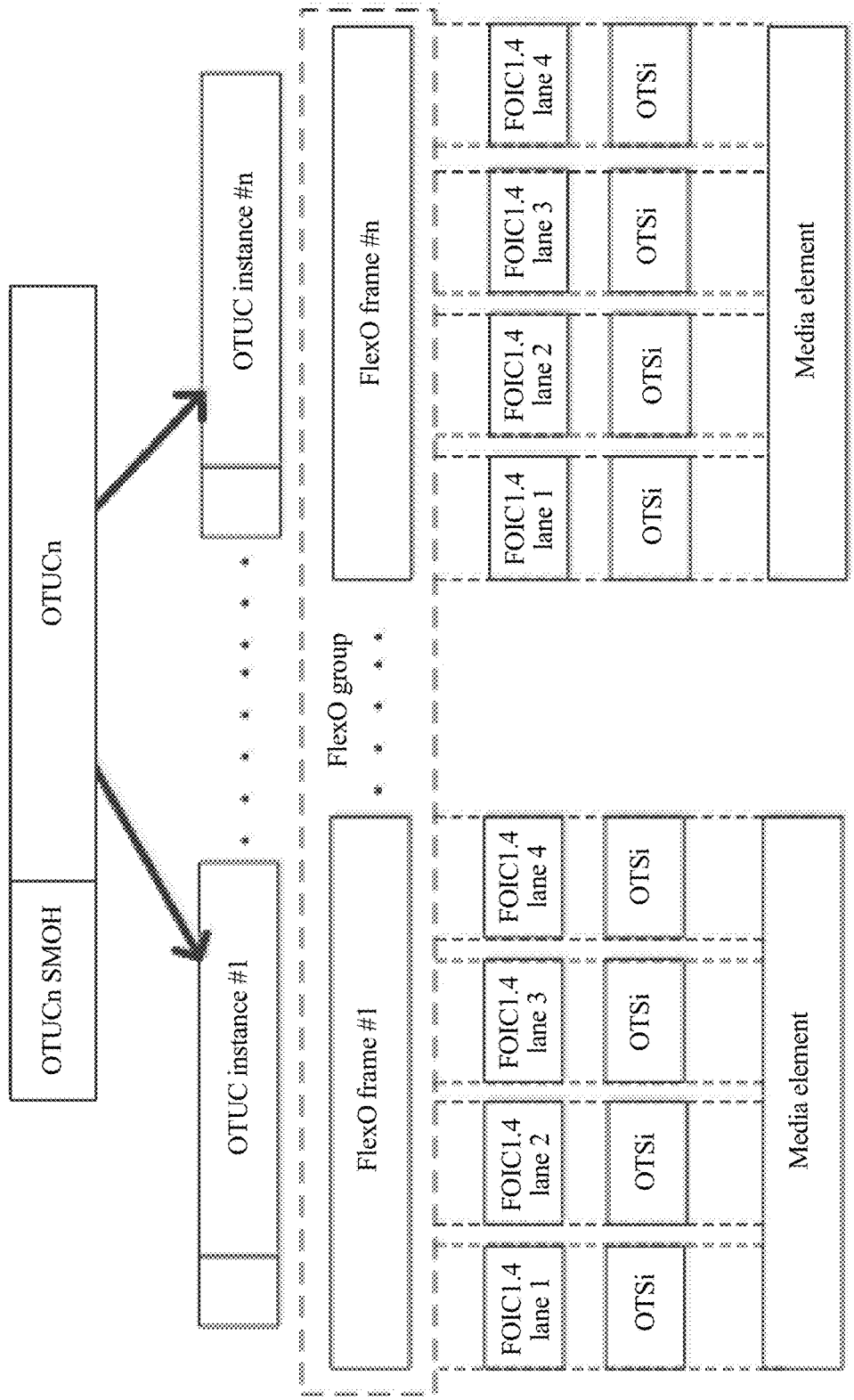
FIG. 1 is a schematic diagram of a scenario in which a client signal is sent in the prior art.
Figure 2:
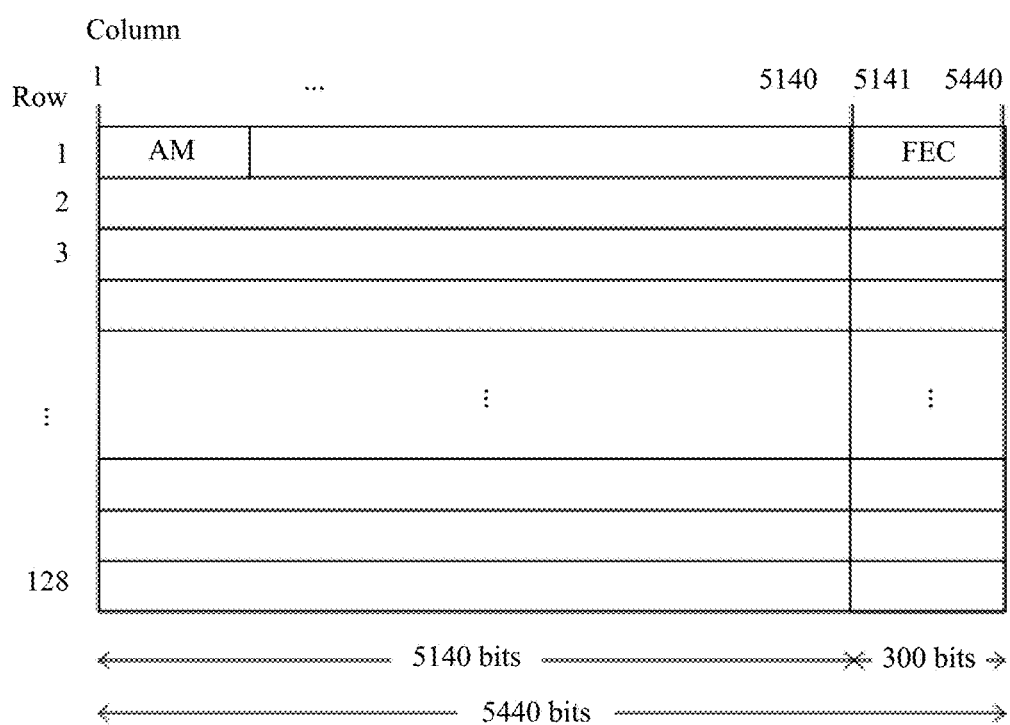
FIG. 2 is a schematic structural diagram of a FlexO frame in the prior art.
Figure 3:
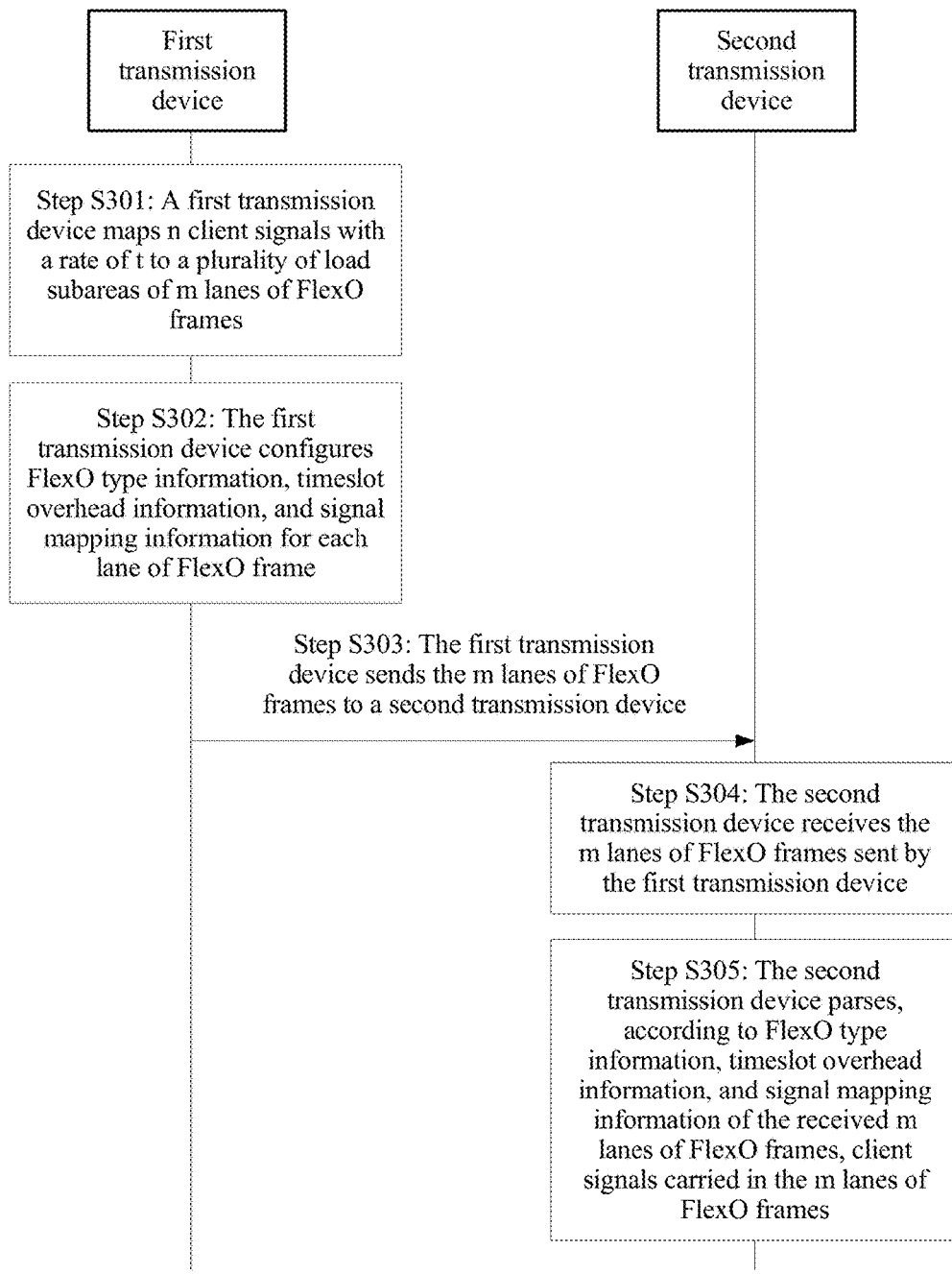
FIG. 3 is a schematic flowchart of a service transmission method according to an embodiment of the present invention.

Referring to FIG. 3, FIG. 3 is a schematic flowchart of a service transmission method according to an embodiment of the present invention, and the method includes the following procedure.

Step S301: A first transmission device maps n client signals with a rate of t to a plurality of load subareas of m lanes of FlexO frames.

Composition manners of the n client signals with the rate of t include but are not limited to the following cases:

Case 1: The n client signals are obtained by dividing an Optical Transport Unit-Cn (OTUCn) into n client signals. For example, an optical channel transport unit (OTUCn) is divided, at an interval of a preset length (for example, 16 bytes), into n client signals OTUCx1, OTUCx2, . . . , OTUCx(j−1), OTUCxj, . . . , OTUCx(n−1), and OTUCxn with the rate of t, where j and n are both even numbers.

Case 2: The n client signals include client signals in a plurality of optical channel transport units. For example, an optical channel transport unit (OTUC5) is divided into five client signals OTUCx1, OTUCx2, OTUCx3, OTUCx4, and OTUCx5, and an optical channel transport unit (OTUC3) is divided into three client signals OTUCy1, OTUCy2, and OTUCy3. The n client signals are specifically the client signals OTUCx1, OTUCx2, OTUCx3, OTUCx4, OTUCx5, OTUCy1, OTUCy2, and OTUCy3.

Case 3: The n client signals are an odd quantity of client signals, that is, n is an odd number. For example, an optical channel transport unit (OTUC5) is divided, at an interval of a preset length (for example, 16 bytes), into five client signals OTUCx1, OTUCx2, OTUCx3, OTUCx4, and OTUCx5 with the rate of t.

A common rate of the client signal is 100 G In the future, there may be client signals with other rates, such as 25 G, 50 G, 75 G, 125 G, 150 G, 175 G, and 225 G. The first transmission device includes a FlexO group interface, a FlexO group interface signal of the FlexO group interface includes FlexO frames of m FlexO lanes with a transmission rate of s, and each FlexO lane is used to transmit one lane of FlexO frame. For example, a FlexO frame 1 (FlexO frame 1) is transmitted on a first FlexO lane, and a FlexO frame 2 (FlexO frame 2) is transmitted on a second FlexO lane. The rest may be deduced by analogy. A payload area of each lane of FlexO frame is divided into s/t load subareas, payload areas of the m lanes of FlexO frames are divided into ms/t load subareas, and each client signal is mapped to one load subarea. A specific load subarea to which a client signal is mapped is not limited herein. The common transmission rate s of the FlexO lane is 100 G, 200 G, 400 G, or the like. A specific transmission rate is determined by an optical module disposed on the first transmission device, where n, s, and t are all positive numbers, and a value of s/t is an integer. Generally, the transmission rate s of the FlexO lane is set to an integral multiple of a rate of a client signal. Therefore, the value of s/t is an integer.

Figure 4:
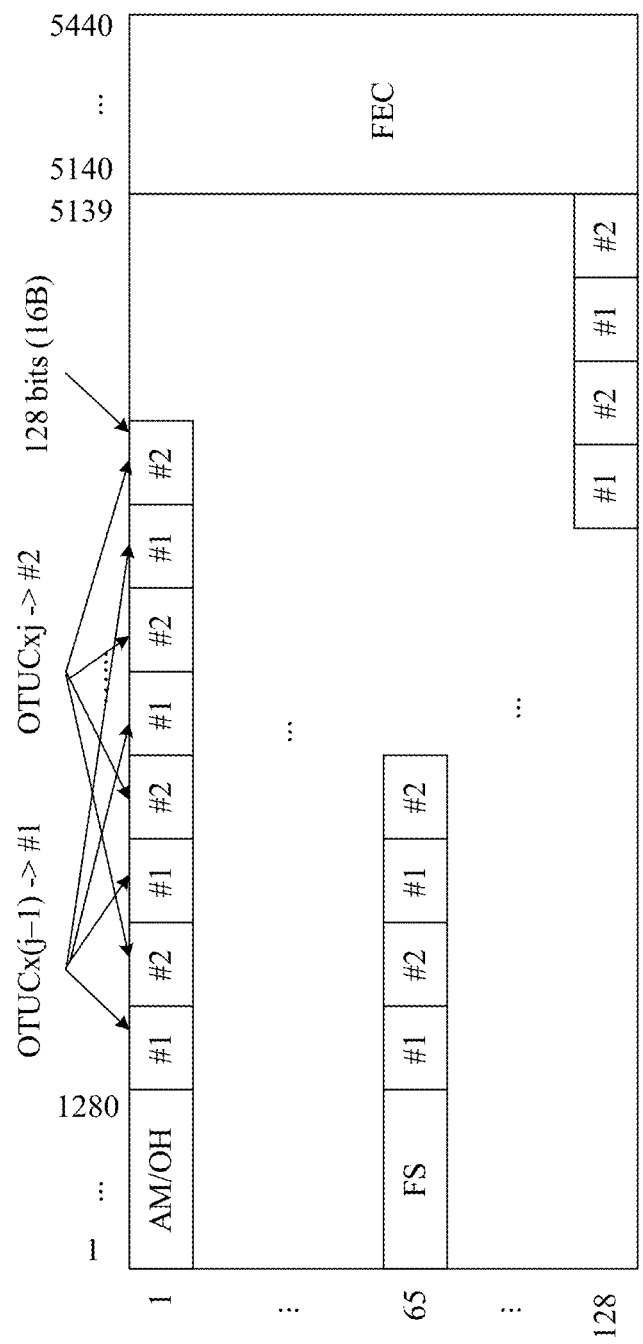
FIG. 4 is a schematic structural diagram of a FlexO frame according to an embodiment of the present invention.

For example, it is assumed that a transmission rate of each FlexO lane is 200 G, and a rate of a client signal is 100 G, then s/t=2. As shown in FIG. 4, a structure of each lane of FlexO frame may be configured to include 128 rows and 5440 columns (a width of each column is 1 bit). All the first 5140 columns except an AM/OH field and an FS field in the columns are a payload area, and the payload area may be divided into a load subarea #1 and a load subarea #2 in sequence according to a 128-bit granularity.

Figure 6:
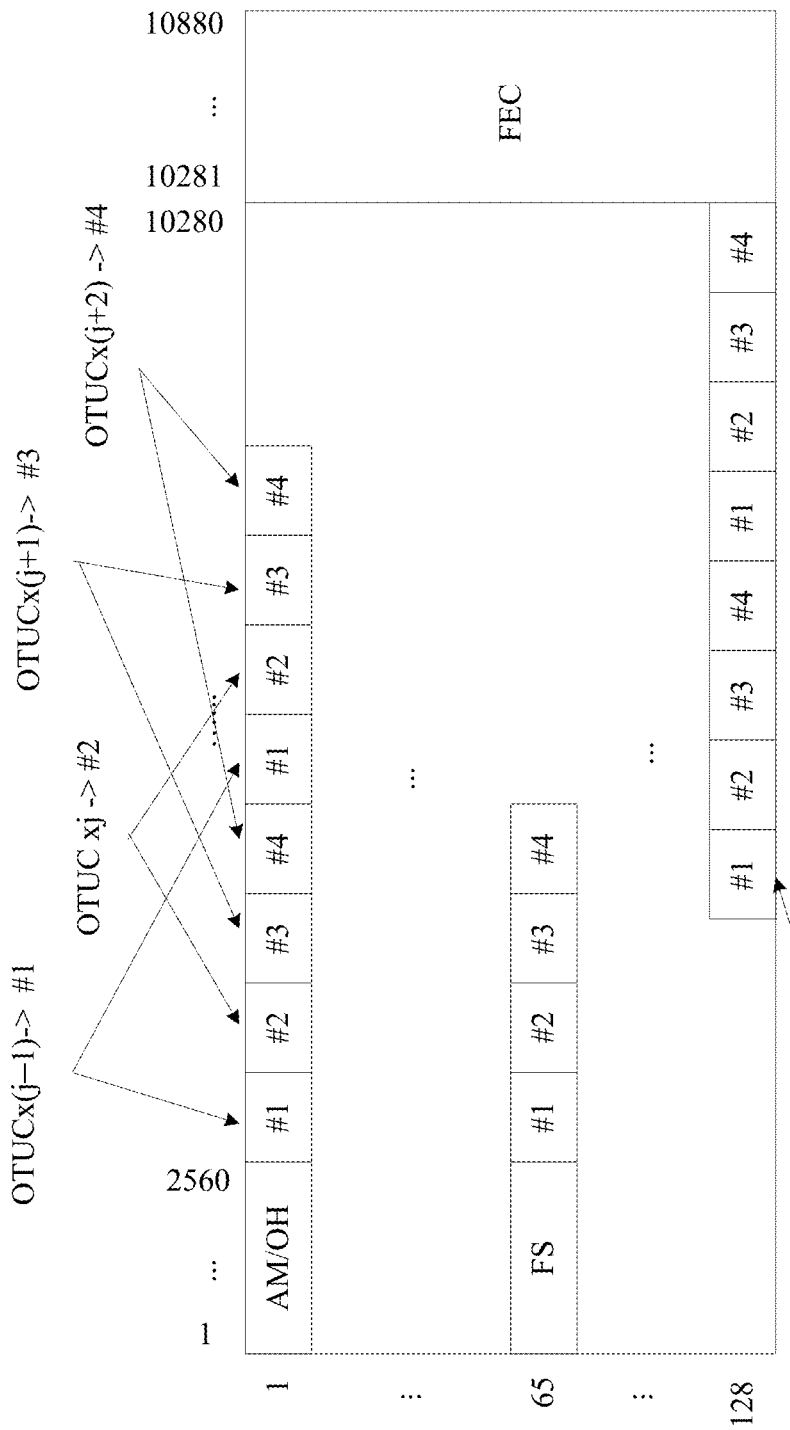
FIG. 6 is a schematic structural diagram of another FlexO frame according to an embodiment of the present invention.

For example, it is assumed that a transmission rate of each FlexO lane is 400 G, and a rate of a client signal is 100 G, then s/t=4. As shown in FIG. 6, a structure of each lane of FlexO frame may be configured to include 128 rows and 10880 columns (a width of each column is 1 bit). Two 200 G FlexO frames form the structure by means of 16-byte interleaving. All the first 10280 columns except an AM/OH field and an FS field are a payload area, and the payload area may be divided into a load subarea #1, a load subarea #2, a load subarea #3, and a load subarea #4 in sequence according to a 128-bit granularity.

In the case 1, ms/t=n, the n client signals are from one optical channel transport unit, the n client signals are mapped to the ms/t load subareas, and one client signal is mapped to each load subarea. For example, n client signals OTUCx1, OTUCx2, . . . , OTUCx(j−1), OTUCxj, . . . , OTUCx(n−1), and OTUCxn from an optical channel transport unit (OTUCn) are respectively mapped to a load subarea #1 of a FlexO frame 1, a load subarea #2 of the FlexO frame 1, . . . , a load subarea #1 of a FlexO frame j/2, a load subarea #2 of the FlexO frame j/2, . . . , a load subarea #1 of a FlexO frame n/2, and a load subarea #2 of the FlexO frame n/2.

In the case 2, ms/t=n, the n client signals are from a plurality of optical channel transport units, the n client signals are mapped to the ms/t load subareas, and one client signal is mapped to each load subarea. Client signals in different optical channel transport units may be mapped to different load subareas of FlexO frames of a same FlexO lane. For example, five client signals OTUCx1, OTUCx2, OTUCx3, OTUCx4, and OTUCx5 from an optical channel transport unit (OTUC5) are respectively mapped to a load subarea #1 of a FlexO frame 1, a load subarea #2 of the FlexO frame 1, a load subarea #1 of a FlexO frame 2, a load subarea #2 of the FlexO frame 2, and a load subarea #1 of a FlexO frame 3. Three client signals OTUCy1, OTUCy2, and OTUCy3 from an optical channel transport unit (OTUC3) are respectively mapped to a load subarea #2 of the FlexO frame 3, a load subarea #1 of a FlexO frame 4, and a load subarea #2 of the FlexO frame 4. The client signals in the two optical channel transport units are transmitted by using a same lane of FlexO frame. In this way, a FlexO group interface can support a slicing mode of an OTUCn chip, thereby improving flexibility of the FlexO group interface. For example, an OTUCn chip in the slicing mode and supporting a maximum bandwidth of n×100 G can support both independent transmission of one optical channel transport unit OTUCn, and transmission of a plurality of optical channel transport units OTUCn1, OTUCn2, . . . , and OTUCni, where n1+n2+ . . . +ni=n.

In the case 3, ms/t>n, the n client signals are mapped to n load subareas in the ms/t load subareas, and no client signal is mapped to (ms/t−n) load subareas in the ms/t load subareas. In this case, an OTUC stuff frame may be filled in the (ms/t−n) load subareas. A format of the OTUC stuff frame is similar to a format of a client signal, but the OTUC stuff frame is used to transmit a replacement signal. For example, the OTUC stuff frame carries an OTUC FAS frame header, and other areas are filled with a PRBS sequence. For another example, the OTUC stuff frame is an OTUC LCK frame. For example, the five client signals OTUCx1, OTUCx2, OTUCx3, OTUCx4, and OTUCx5 are respectively mapped to a load subarea #1 of a FlexO frame 1, a load subarea #2 of the FlexO frame 1, a load subarea #1 of a FlexO frame 2, a load subarea #2 of the FlexO frame2, and a load subarea #1 of a FlexO frame3. In addition, an OTUC stuff frame is filled in a load subarea #2 of the FlexO frame 3, so as to improve service bearer flexibility.

It should be noted that a specific load subarea to which a client signal is mapped is not limited herein. A preconfigured algorithm may be used to calculate a specific load subarea to which a client signal is mapped, so that a client signal can be flexibly mapped.

Step S302: The first transmission device configures FlexO type information, timeslot overhead information, and signal mapping information for each lane of FlexO frame.

Specifically, a plurality of FlexO frames of each lane of FlexO frame form a FlexO multiframe, and each FlexO frame corresponds to overhead information of a load subarea carrying this lane of FlexO frame. This lane of FlexO frame includes FlexO type information, and a group of overhead indication information that is corresponding to each load subarea and that includes timeslot overhead information, signal mapping information, and the like. The group of overhead indication information is used to indicate statuses of the lane of FlexO frame and the corresponding load subarea. Therefore, the lane of FlexO frame includes at least the FlexO type information, and s/t groups of overhead indication information that are in a one-to-one correspondence to s/t load subareas of the lane of FlexO frame.

For example, a FlexO frame 0, a FlexO frame 1, . . . , and a FlexO frame 7 of each lane of FlexO frame form one FlexO multiframe. The lane of FlexO frame includes a load subarea #1 and a load subarea #2. It may be specified that the FlexO frame 0 carries FlexO type information and overhead information of the load subarea #1, and the FlexO frame 1 carries overhead information of the load subarea #2. Specifically, the FlexO type information, overheads of the load subarea #1, and overheads of the load subarea #2 may be carried in an "AM/OH" field of the lane of FlexO frame. Specifically, the overheads of the load subarea #1 of the lane of FlexO frame are defined in a row 0 in eight rows of overheads (40 bytes per row) shown in FIG. 5, the overheads of the load subarea #2 of the FlexO frame are defined in a row 1 in the eight rows of overheads (40 bytes per row) shown in FIG. 5, and a row 2 to a row 7 of overheads are reserved bytes. A load subarea corresponding to each of the FlexO frame 0 to the FlexO frame 6 includes 2560 16-byte blocks, and a load subarea corresponding to the FlexO frame 7 includes 2565 16-byte blocks.

FIG. 9 shows a one-to-one correspondence between a plurality of groups of overhead indication information and a plurality of load subareas. The first column is a Multiframe Alignment Signal (MFAS). In the second column, when a transmission rate of a FlexO frame lane corresponding to this lane of FlexO frame is 100 G and a rate of a client signal is 100 G, a payload area of this lane of FlexO frame is not divided into a plurality of load subareas. In the third column, when a transmission rate of a FlexO frame lane corresponding to this lane of FlexO frame is 200 G and a rate of a client signal is 100 G, a payload area of this lane of FlexO frame is divided into a load subarea #1 and a load subarea #2. In addition, overheads of the load subarea #1 are defined by an overhead indication in a row (group) whose "MFAS" number is 0 in FIG. 5, and overheads of the load subarea #2 are defined by an overhead indication in a row (group) whose "MFAS" number is 1 in FIG. 5. The rest may be deduced by analogy.

FlexO type information: FlexO type information of each lane of FlexO frame is used to indicate a FlexO group interface type of a FlexO group interface to which this lane of FlexO frame belongs. Currently, there is an m×100 G FlexO group interface type. As technologies of 200 G and 400 G client-side optical modules become mature, an m×200 G FlexO group interface type and an m×400 G FlexO group interface type may appear subsequently. The FlexO group interface type indicates a transmission rate of a FlexO lane for transmitting this lane of FlexO frame and a load subarea division status of a payload area of this lane of FlexO frame. For example, the m×200 G FlexO group interface type indicates that the transmission rate of the FlexO lane for transmitting this lane of FlexO frame is 200 G If a rate of a client signal carried in this lane of FlexO frame is 100 G, the payload area of this lane of FlexO frame may be divided into 200 G/100 G=2 load subareas. The FlexO type information may also be referred to as a FlexO payload type indication. For example, type information of a FlexO frame 1 is used to indicate a type of a FlexO group interface that transmits the FlexO frame 1.

Optionally, the FlexO type information of this lane of FlexO frame may be an identifier corresponding to the FlexO group interface that corresponds to this lane of FlexO frame. It is assumed that an identifier of the m×100 G FlexO group interface type is preset to 1, an identifier of the m×200 G FlexO group interface type is preset to 2, and an identifier of the m×400 G FlexO group interface type is preset to 3. In this case, when this lane of FlexO frame corresponds to the m×200 G FlexO group interface type, a value 2 is included in the FlexO type information of this lane of FlexO frame to indicate that this lane of FlexO frame corresponds to the m×200 G FlexO group interface type. The FlexO type information may be encapsulated into an "FOGT" field shown in FIG. 5. Optionally, the FlexO type information of this lane of FlexO frame may be a specific value of the FlexO group interface type corresponding to this lane of FlexO frame. Assuming that this lane of FlexO frame corresponds to the m×200 G FlexO group interface type, the FlexO type information of this lane of FlexO frame includes a value 200 G.

Timeslot overhead information: Each of the n client signals corresponds to a client signal identifier of the client signal, and timeslot overhead information of each lane of FlexO frame includes a client signal identifier of a client signal carried in each load subarea of this lane of FlexO frame. For example, if a payload area of this lane of FlexO frame includes a load subarea #1 and a load subarea #2, the timeslot overhead information of this lane of FlexO frame includes a client signal identifier x1 of a client signal x1 mapped to the load subarea #1 and a client signal identifier x2 of a client signal x2 mapped to the load subarea #2.

If the n client signals include client signals in a plurality of optical channel transport units (that is, the "case 2"), the timeslot overhead information may further include an optical channel transport unit identifier. For example, the plurality of optical channel transport units are specifically a first optical channel transport unit (OTUC5) and a second optical channel transport unit (OTUC3). An optical channel transport unit identifier of the first optical channel transport unit (OTUC5) is 1, the first optical channel transport unit (OTUC5) is divided into five client signals, and client signal identifiers corresponding to the five client signals are x1, x2, x3, x4, and x5. An optical channel transport unit identifier of the second optical channel transport unit (OTUC3) is 2, the second optical channel transport unit (OTUC3) is divided into three client signals, and client signal identifiers corresponding to the three client signals are y1, y2, and y3. If a load subarea #1 of this lane of FlexO frame carries a client signal x3 of the first optical channel transport unit (OTUC5), the timeslot overhead information configured for this lane of FlexO frame includes the optical channel transport unit identifier 1 and the client signal identifier x3.

Optionally, the timeslot overhead information may further include a resource occupation identifier, and the resource occupation identifier is used to indicate whether a client signal is mapped to each load subarea of this lane of FlexO frame. For example, if one of the n client signals is mapped to the load subarea #1 of this lane of FlexO frame, a resource occupation identifier corresponding to the load subarea #1 in the timeslot overhead information may be set to 1, to indicate that the load subarea #1 of this lane of FlexO frame is occupied. If no client signal in the n client signals is mapped to the load subarea #1 of this lane of FlexO frame, a resource occupation identifier corresponding to the load subarea #1 in the timeslot overhead information may be set to 0, to indicate that the load subarea #1 of this lane of FlexO frame is not occupied.

The timeslot overhead information may be encapsulated into a "client timeslot" field shown in FIG. 5. When the timeslot overhead information includes a client signal identifier and a resource occupation identifier, a structure of the "client timeslot" field may be shown in FIG. 7. When the timeslot overhead information includes a client signal identifier, an optical channel transport unit identifier, and a resource occupation identifier, a structure of the "client timeslot" field may be shown in FIG. 8. The resource occupation identifier is encapsulated into an "OCCU" field, the client signal identifier is encapsulated into an "OTUC ID" field, and the optical channel transport unit identifier is encapsulated into an "OTUCn ID" field.

Signal mapping information: Signal mapping information of each lane of FlexO frame is used to indicate mapping information of a client signal carried in each load subarea of this lane of FlexO frame, the mapping information may generally include a quantity of client signals mapped to corresponding load subareas (the quantity is obtained by performing division at a predetermined granularity), clock information of a client signal, and the like, and the signal mapping information may be filled in a "MON" field in FIG. 4.

In an optional solution, each of a FlexO frame 0 to a FlexO frame 7 of this lane of FlexO frame may be configured to use a 14-byte "FCC" field (for example, an "FCC" field shown in FIG. 5) to represent FCC overheads, so that information about the FCC overheads can be more evenly distributed. This facilitates management of real-time continuous transmission of lane information.

In another optional solution, each of a FlexO frame 0 to a FlexO frame 7 of this lane of FlexO frame may be configured to use a 2-byte "OSMC" field (for example, an "OSMC" field shown in FIG. 5) to carry information about an optical transport network synchronization messaging channel (OTN synchronization messaging channel), so as to implement a FlexO lane time synchronization capability.

In still another optional solution, each of a FlexO frame 0 to a FlexO frame 7 of this lane of FlexO frame may be configured to use a "PIG" field to indicate a FlexO frame identifier of this lane of FlexO frame.

In yet another optional solution, overhead quantity information may be configured for this lane of FlexO frame. For example, an "AVAIL" field may be set in the "AM/OH" field, and the "AVAIL" field indicates a quantity of load subareas that are of this lane of FlexO frame and to which client signals are mapped. For example, the "AVAIL" field may be set to 1, to indicate that a client signal is mapped to one load subarea; the "AVAIL" field may be set to 2, to indicate that client signals are mapped to two load subareas.

It should be noted that, a sequence of performing step S301 and step S302 is not limited herein. Step 301 may be performed before step 302, or step 302 may be performed before step 301, or step 301 and step 302 may be simultaneously performed. "This lane of FlexO frame" is described by using one of the m lanes of FlexO frames as an example. A principle of another lane of FlexO frame in the m lanes of FlexO frames is the same as a principle of "this lane of FlexO frame".

Step S303: The first transmission device sends the m lanes of FlexO frames to a second transmission device.

Specifically, the first transmission device transmits the FlexO frames by using m FlexO lanes, and each FlexO lane is used to transmit one lane of FlexO frame.

Figure 10:
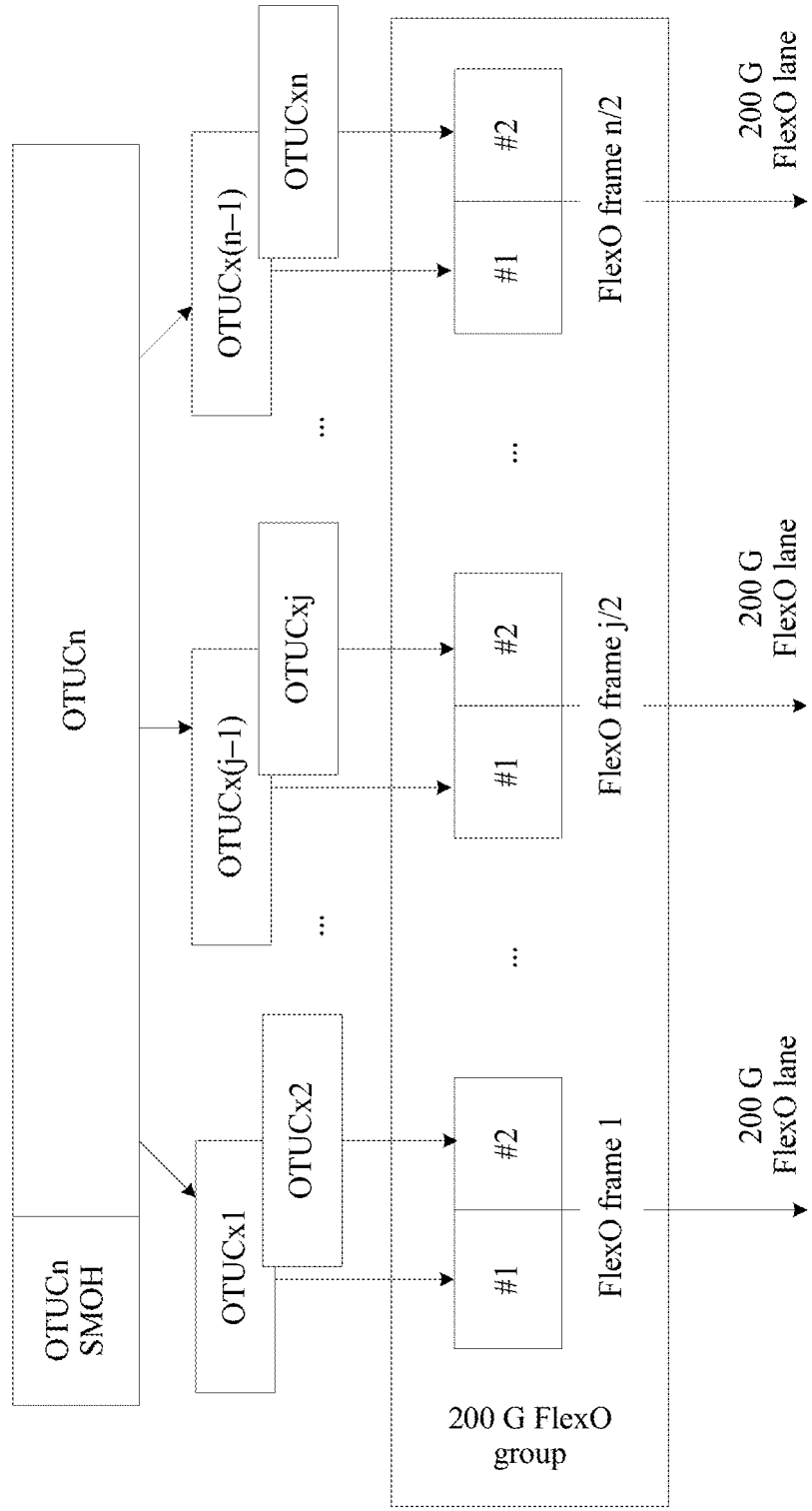
FIG. 10 is a schematic diagram of a scenario in which a FlexO frame is transmitted according to an embodiment of the present invention.

FIG. 10 is a schematic diagram of a scenario in which a FlexO frame is transmitted in the case 1. In the example in the case 1, a rate of each client signal is 100 G and a transmission rate of each of the n/2 FlexO lanes is 200 G. The load subarea #1 of the FlexO frame 1 carries the client signal OTUCx1, the load subarea #2 of the FlexO frame 1 carries the client signal OTUCx2, the load subarea #1 of the FlexO frame j/2 carries the client signal OTUCx(j−1), the load subarea #2 of the FlexO frame j/2 carries the client signal OTUCxj, the load subarea #1 of the FlexO frame n/2 carries the client signal OTUCx(n−1), and the load subarea #2 of the FlexO frame n/2 carries the client signal OTUCxn. The rest may be deduced by analogy.

Figure 11:
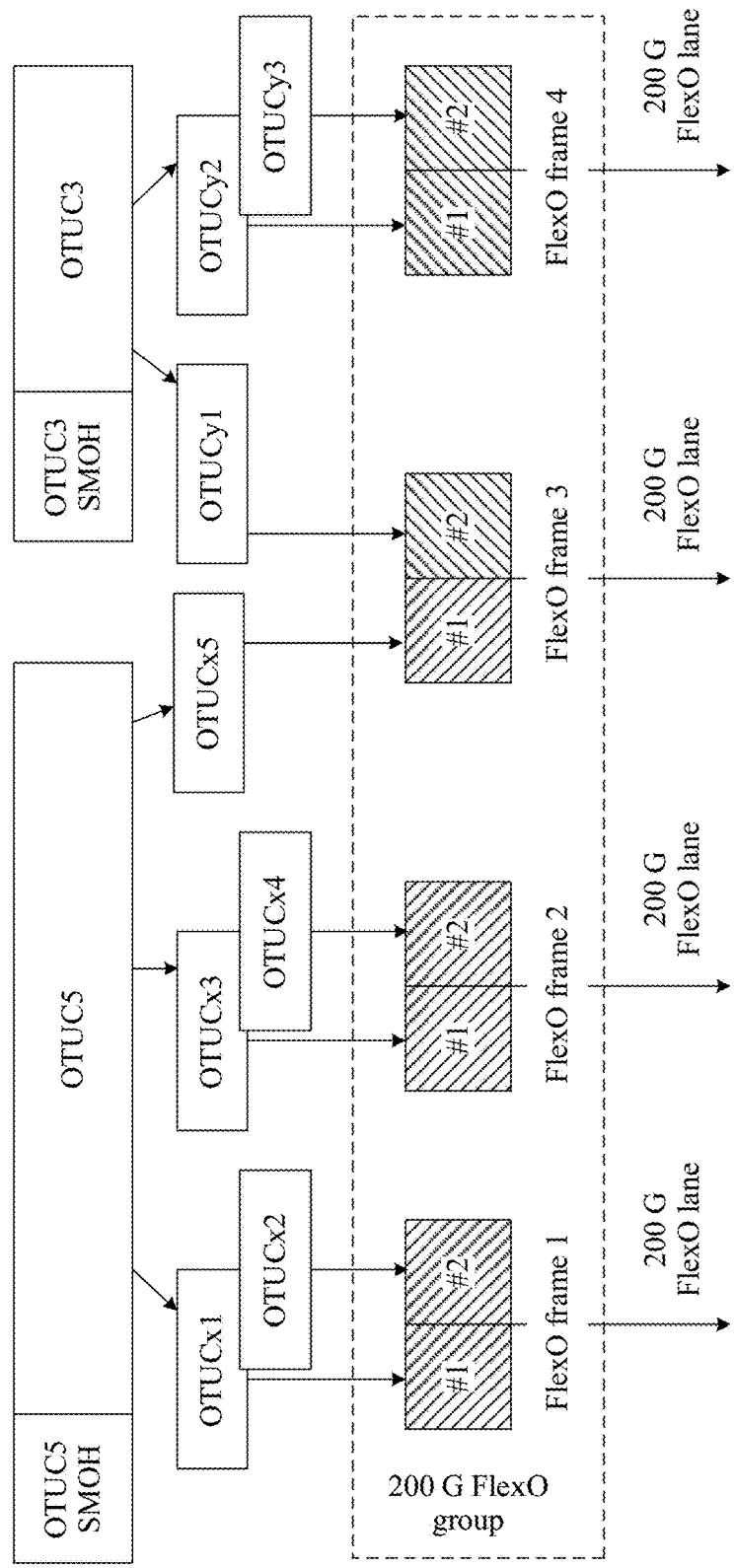
FIG. 11 is a schematic diagram of another scenario in which a FlexO frame is transmitted according to an embodiment of the present invention.

FIG. 11 is a schematic diagram of a scenario in which a FlexO frame is transmitted in the case 2. In the example in the case 2, a rate of each client signal is 100 G and a transmission rate of each of the four FlexO lanes is 200 G In the example in the case 2, the load subarea #1 of the FlexO frame 1 carries the client signal OTUCx1, the load subarea #2 of the FlexO frame 1 carries the client signal OTUCx2, the load subarea #1 of the FlexO frame 2 carries the client signal OTUCx3, the load subarea #2 of the FlexO frame 2 carries the client signal OTUCx4, the load subarea #1 of the FlexO frame 3 carries the client signal OTUCx5, the load subarea #2 of the FlexO frame 3 carries the client signal OTUCy1, the load subarea #1 of the FlexO frame 4 carries the client signal OTUCy2, and the load subarea #2 of the FlexO frame 4 carries the client signal OTUCy3. The rest may be deduced by analogy. FIG. 12 shows information about "client timeslot" and "MOH" fields corresponding to four lanes (optional) of FlexO frames.

Figure 13:
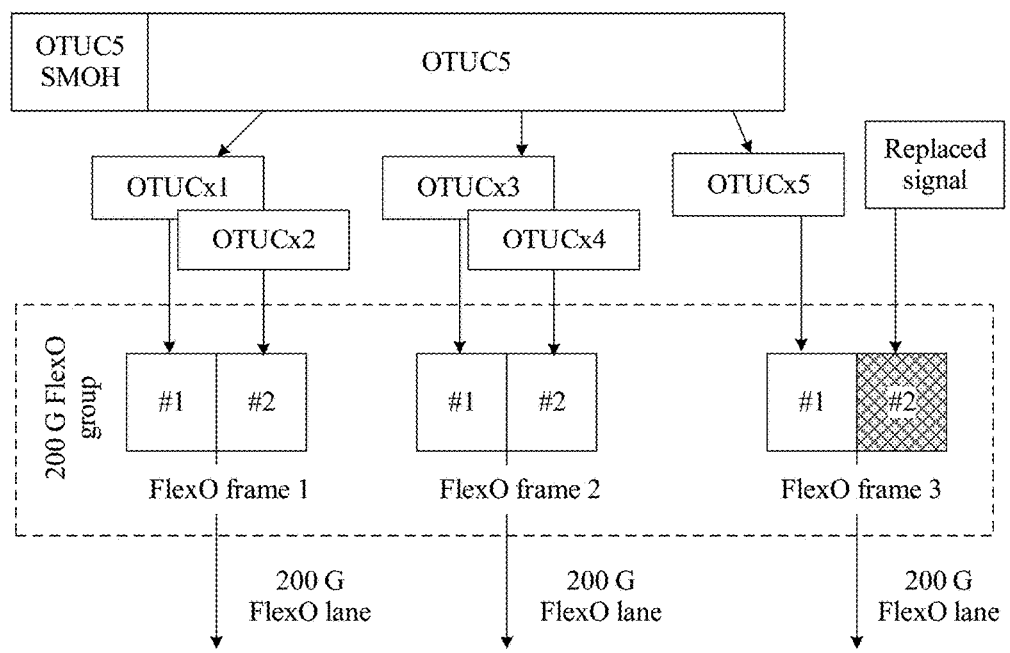
FIG. 13 is a schematic diagram of still another scenario in which a FlexO frame is transmitted according to an embodiment of the present invention.

FIG. 13 is a schematic diagram of a scenario in which a FlexO frame is transmitted in the case 3. In the example in the case 3, a rate of each client signal is 100 G and a transmission rate of each of the three FlexO lanes is 200 G. The load subarea #1 of the FlexO frame 1 carries the client signal OTUCx1, the load subarea #2 of the FlexO frame 1 carries the client signal OTUCx2, the load subarea #1 of the FlexO frame 2 carries the client signal OTUCx3, the load subarea #2 of the FlexO frame 2 carries the client signal OTUCx4, the load subarea #1 of the FlexO frame 3 carries the client signal OTUCx5, and the load subarea #2 of the FlexO frame 3 carries the OTUC stuff frame (replacement signal). The rest may be deduced by analogy.

Step S304: The second transmission device receives the m lanes of FlexO frames sent by the first transmission device.

Step S305: The second transmission device parses, according to FlexO type information, timeslot overhead information, and signal mapping information of the received m lanes of FlexO frames, client signals carried in the m lanes of FlexO frames.

Specifically, client signals of FlexO frames sent from FlexO lanes of different FlexO group interface types may have different parsing policies. Therefore, the second transmission device may determine, by using the FlexO type information, a specific parsing policy for parsing the received FlexO frame. Further, when parsing the client signal from the FlexO frame, the second transmission device needs to learn a client-signal-carrying situation of each load subarea, and the timeslot overhead information is used to indicate which client signal is carried in each load subarea of the FlexO frame. Further, after learning a specified client signal carried in each load subarea of the FlexO frame, the second transmission device further needs to learn distribution of a client signal in a load subarea, and the signal mapping information is used to indicate distribution of each client signal in the payload area.

According to the method shown in FIG. 3, the first transmission device configures each of different load subareas of a payload area of a FlexO frame to carry one client signal, and can flexibly configure, according to a requirement, a specific load subarea for carrying a specific client signal, thereby improving service transmission flexibility.

The method in the embodiments of the present invention is described in detail above. For ease of better implementing the foregoing solution in the embodiments of the present invention, an apparatus in an embodiment of the present invention is correspondingly provided below.

Figure 14:
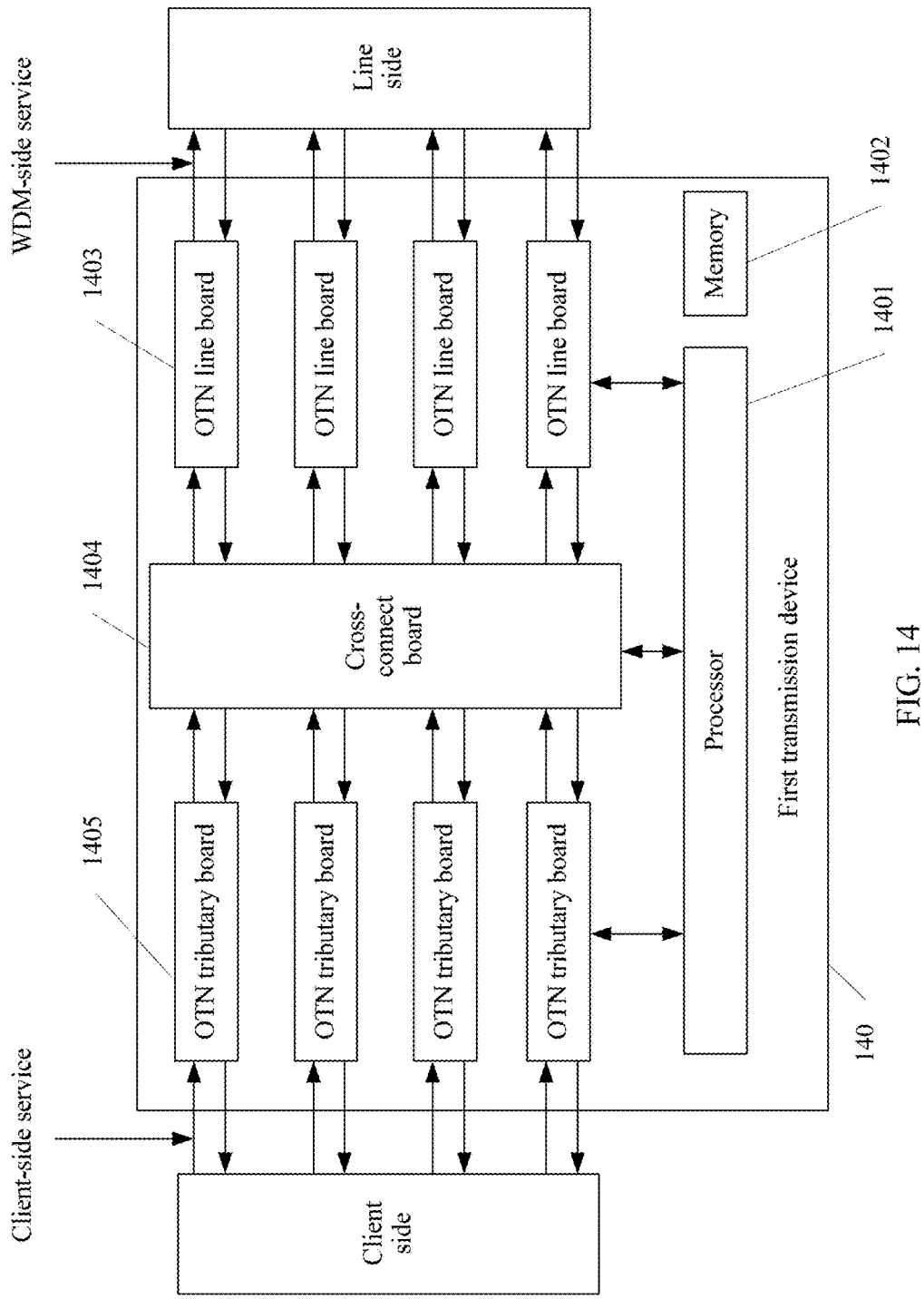
FIG. 14 is a schematic structural diagram of a first transmission device according to an embodiment of the present invention.

Referring to FIG. 14, FIG. 14 is a schematic structural diagram of a first transmission device 140 according to an embodiment of the present invention. The first transmission device 140 may include a processor (for example, a main board) 1401, a memory 1402, an OTN line board 1403, a cross-connect board 1404, and an OTN tributary board 1405. A service may be transmitted from a client side to a line side or from a line side to a client side. A service sent or received on the client side is referred to as a client-side service, and a service received or sent on the line side is referred to as a WDM-side service. Service processing procedures in the two directions are reverse to each other.

The processor 1401 is connected to the memory 1402, the OTN line board 1403, the cross-connect board 1404, and the OTN tributary board 1405 directly or by using a bus, and is configured to control and manage the OTN line board 1403, the cross-connect board 1404, and the OTN tributary board 1405.

The OTN tributary board 1405 is configured to encapsulate and map a client signal (a service signal). The client signal includes a plurality of service types, such as an Asynchronous Transfer Mode (ATM) service, an Synchronous Digital Hierarchy (SDH) service, an Ethernet service, a Common Public Radio Interface, common public radio interface (CPRI) service, and a storage service. Specifically, the tributary board 1405 is configured to: receive a signal from the client side, encapsulate and map the received client signal into an ODU signal, and add corresponding OTN management and monitoring overheads. On the OTN tributary board 1405, the ODU signal may be a lower-order ODU signal, such as an ODU0, ODU1, ODU2, ODU3, or ODU-flex signal. The OTN management and monitoring overheads may be ODU overheads. Different types of client signals are encapsulated and mapped into different ODU signals in different manners.

The cross-connect board 1404 is configured to implement a full cross-connection between the tributary board 1405 and the line board 1403, thereby implementing flexible cross-connect grooming of an ODU signal. Specifically, the cross-connect board 1404 can transmit an ODU signal from any tributary board to any line board, or transmit an OTU signal from any line board to any line board, or transmit a client signal from any tributary board to any tributary board.

The OTN line board 1403 is configured to: generate an Optical Transport Unit-Cn (OTUCn) signal from an ODU signal, and send the optical channel transport unit signal to the line side. Before the OTU signal is generated from the ODU signal, the OTN line board 1403 may multiplex a plurality of lower-order ODU signals to a higher-order ODU signal. Then, corresponding OTN management and monitoring overheads are added to the higher-order ODU signal to generate the OTU signal and the OTU signal is sent to an optical transport channel on the line side. On the OTN line board 1403, the higher-order ODU signal may be an ODU1, ODU2, ODU3, or ODU4 signal, or the like. The OTN management and monitoring overheads may be OTU overheads.

The processor 1401 invokes a program in the memory 1402 and is configured to perform the following operations:

mapping n client signals with a rate of t to ms/t load subareas of m lanes of FlexO frames, where each client signal is mapped to one load subarea, a payload area of each of the m lanes of FlexO frames is divided into s/t load subareas, and each lane of FlexO frame is transmitted by using a FlexO lane with a transmission rate of s, where s, t, m, and s/t are all positive integers;

configuring FlexO type information, timeslot overhead information, and signal mapping information for each lane of FlexO frame, where the FlexO type information is used to indicate a FlexO group interface type, and the FlexO group interface type indicates the transmission rate of the FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame; and transmitting the m lanes of FlexO frames to a second transmission device by using m FlexO lanes with the transmission rate of s and by using the line board 1403, where the second transmission device is configured to parse, according to the FlexO type information, the timeslot overhead information, and the signal mapping information, the client signals carried in the ms/t load subareas.

By performing the foregoing operations, the first transmission device 140 configures each of different load subareas of a payload area of a FlexO frame to carry one client signal, and can flexibly configure, according to a requirement, a specific load subarea for carrying a specific client signal, thereby improving service transmission flexibility.

In an optional solution, the processor 1401 is further configured to: when n<ms/t, fill a replacement signal in a load subarea that is in the ms/t load subareas and to which no client signal is mapped.

In another optional solution, the n client signals with the rate of t include client signals in at least two optical channel transport units, and each optical channel transport unit includes at least one client signal.

Specifically, the first transmission device enables client signals of optical channel transport units with a plurality of rates to be carried on a same group of FlexO group interfaces, thereby improving flexibility of carrying a client signal in a FlexO frame.

In still another optional solution, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

Specifically, a plurality of load subareas of one lane of FlexO frame can carry client signals of optical channel transport units with a plurality of rates, thereby improving flexibility of carrying a client signal in a FlexO frame.

In yet another optional solution, the timeslot overhead information is further used to indicate an optical channel transport unit to which the client signals mapped to the s/t load subareas of each lane of FlexO frame belong.

In still yet another optional solution, before the transmitting the m lanes of FlexO frames to a second transmission device by using m FlexO lanes with the transmission rate of s and by using the line board 1403, the processor 1401 is further configured to:

configure quantity overhead information for each lane of FlexO frame, where the quantity overhead information is used to indicate a quantity of load subareas that are in the load subareas of each lane of FlexO frame and to which client signals are mapped.

It should be noted that, for specific implementation of the first transmission device 140, reference can be made to the corresponding description in the method embodiment shown in FIG. 3.

According to the first transmission device 140 shown in FIG. 14, the first transmission device 140 configures each of different load subareas of a payload area of a FlexO frame to carry one client signal, and can flexibly configure, according to a requirement, a specific load subarea for carrying a specific client signal, thereby improving service transmission flexibility.

Figure 15:
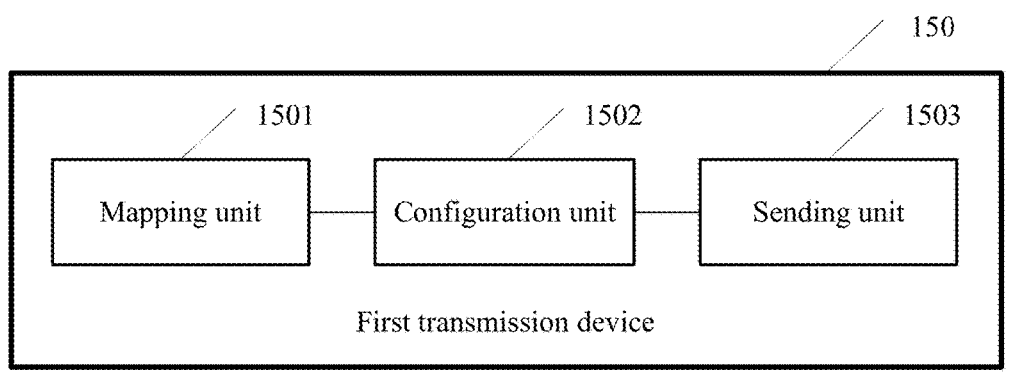
FIG. 15 is a schematic structural diagram of another first transmission device according to an embodiment of the present invention.

FIG. 15 is a schematic structural diagram of another first transmission device 150 according to an embodiment of the present invention. The first transmission device includes a mapping unit 1501, a configuration unit 1502, and a sending unit 1503. Each unit is described in detail below.

The mapping unit 1501 is configured to map n client signals with a rate of t to ms/t load subareas of m lanes of FlexO frames, where each client signal is mapped to one load subarea, a payload area of each of the m lanes of FlexO frames is divided into s/t load subareas, and each lane of FlexO frame is transmitted by using a FlexO lane with a transmission rate of s, where s, t, m, and s/t are all positive integers.

The configuration unit 1502 is configured to configure FlexO type information, timeslot overhead information, and signal mapping information for each lane of FlexO frame, where the FlexO type information is used to indicate a FlexO group interface type, and the FlexO group interface type indicates the transmission rate of the FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame.

The sending unit 1503 is configured to transmit the m lanes of FlexO frames to a second transmission device by using m FlexO lanes with the transmission rate of s. The second transmission device is configured to parse, according to the FlexO type information, the timeslot overhead information, and the signal mapping information, the client signals carried in the ms/t load subareas.

By running the foregoing units, the first transmission device 150 configures each of different load subareas of a payload area of a FlexO frame to carry one client signal, and can flexibly configure, according to a requirement, a specific load subarea for carrying a specific client signal, thereby improving service transmission flexibility.

In an optional solution, the mapping unit 1501 is further configured to: when n<ms/t, fill a replacement signal in a load subarea that is in the ms/t load subareas and to which no client signal is mapped.

In another optional solution, the n client signals with the rate of t include client signals in at least two optical channel transport units, and each optical channel transport unit includes at least one client signal.

Specifically, the first transmission device enables client signals of optical channel transport units with a plurality of rates to be carried on a same group of FlexO group interfaces, thereby improving flexibility of carrying a client signal in a FlexO frame.

In still another optional solution, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

Specifically, a plurality of load subareas of one lane of FlexO frame can carry client signals of optical channel transport units with a plurality of rates, thereby improving flexibility of carrying a client signal in a FlexO frame.

In yet another optional solution, the timeslot overhead information is further used to indicate an optical channel transport unit to which the client signals mapped to the s/t load subareas of each lane of FlexO frame belong.

In still yet another optional solution, the configuration unit 1502 is further configured to configure quantity overhead information for each lane of FlexO frame, where the quantity overhead information is used to indicate a quantity of load subareas that are in the load subareas of each lane of FlexO frame and to which client signals are mapped.

It should be noted that, for specific implementation of the first transmission device 150, reference can be made to the corresponding description in the method embodiment shown in FIG. 3.

According to the first transmission device 150 shown in FIG. 15, the first transmission device 150 configures each of different load subareas of a payload area of a FlexO frame to carry one client signal, and can flexibly configure, according to a requirement, a specific load subarea for carrying a specific client signal, thereby improving service transmission flexibility.

Figure 16:
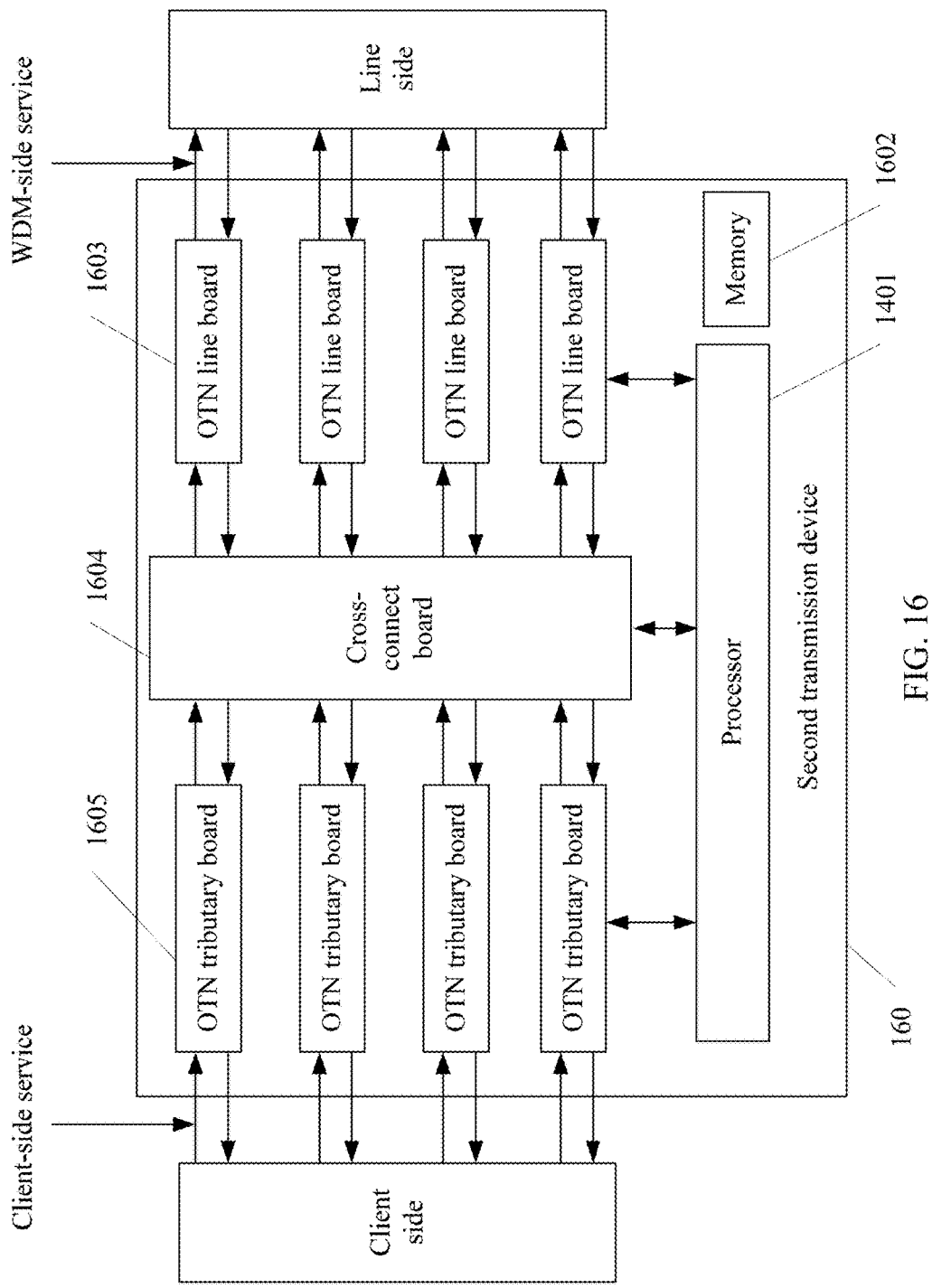
FIG. 16 is a schematic structural diagram of a second transmission device according to an embodiment of the present invention.

Referring to FIG. 16, FIG. 16 is a schematic structural diagram of a second transmission device 160 according to an embodiment of the present invention. The second transmission device 160 may include a processor (for example, a main board) 1601, a memory 1602, an OTN line board 1603, a cross-connect board 1604, and an OTN tributary board 1605. A service transmission direction may be from a client side to a line side or from a line side to a client side. A service sent or received on the client side is referred to as a client-side service, and a service received or sent on the line side is referred to as a WDM-side service. Service processing procedures in the two directions are reverse to each other.

The processor 1601 is connected to the memory 1602, the OTN line board 1603, the cross-connect board 1604, and the OTN tributary board 1605 directly or by using a bus, and is configured to control and manage the OTN line board 1603, the cross-connect board 1604, and the OTN tributary board 1605.

The OTN tributary board 1605 is configured to encapsulate and map a client signal (a service signal). The client signal includes a plurality of service types, such as an ATM service, an SDH service, an Ethernet service, a CPRI service, and a storage service. Specifically, the tributary board 1605 is configured to: receive a signal from the client side, encapsulate and map the received client signal into an ODU signal, and add corresponding OTN management and monitoring overheads. On the OTN tributary board 1605, the ODU signal may be a lower-order ODU signal, such as an ODU0, ODU1, ODU2, ODU3, or ODUflex signal. The OTN management and monitoring overheads may be ODU overheads. Different types of client signals are encapsulated and mapped into different ODU signals in different manners.

The cross-connect board 1604 is configured to implement a full cross-connection between the tributary board 1605 and the line board 1603, thereby implementing flexible cross-connect grooming of an ODU signal. Specifically, the cross-connect board 1604 can transmit an ODU signal from any tributary board to any line board, or transmit an OTU signal from any line board to any line board, or transmit a client signal from any tributary board to any tributary board.

The OTN line board 1603 is configured to: generate an OTUCn signal from an ODU signal, and send the optical channel transport unit signal to the line side. Before the OTU signal is generated from the ODU signal, the OTN line board 1603 may multiplex a plurality of lower-order ODU signals to a higher-order ODU signal. Then, corresponding OTN management and monitoring overheads are added to the higher-order ODU signal to generate the OTU signal and the OTU signal is sent to an optical transport channel on the line side. On the OTN line board 1603, the higher-order ODU signal may be an ODU1, ODU2, ODU3, or ODU4 signal, or the like. The OTN management and monitoring overheads may be OTU overheads.

The processor 1601 invokes a program in the memory 1602 and is configured to perform the following operations:

receiving, by using the line board 1603, m lanes of FlexO frames sent by a first transmission device by using m FlexO lanes with a transmission rate of s, where each of the m lanes of FlexO frames includes a client signal, FlexO type information, timeslot overhead information, and signal mapping information, where n client signals with a rate of t are mapped to the m lanes of FlexO frames, a payload area of each of the m lanes of FlexO frames is divided into s/t load subareas, and each client signal is mapped to one load subarea; the FlexO type information is used to indicate a FlexO group interface type, and the FlexO group interface type indicates a transmission rate of a FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame, where s, t, m, and s/t are all positive integers; and parsing, according to the FlexO type information, the timeslot overhead information, and the signal mapping information, the client signals carried in the ms/t load subareas.

By performing the foregoing operations, the first transmission device configures each of different load subareas of a payload area of a FlexO frame to carry one client signal, and can flexibly configure, according to a requirement, a specific load subarea for carrying a specific client signal, thereby improving service transmission flexibility.

In an optional solution, when n<ms/t, a replacement signal is filled in a load subarea that is in the ms/t load subareas and to which no client signal is mapped.

In another optional solution, the n client signals with the rate of t include client signals in at least two optical channel transport units, and each optical channel transport unit includes at least one client signal.

In still another optional solution, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

In yet another optional solution, the timeslot overhead information is further used to indicate an optical channel transport unit to which the client signals mapped to the s/t load subareas of each lane of FlexO frame belong.

It should be noted that, for specific implementation of the second transmission device 160 shown in FIG. 16, reference can be made to the corresponding implementation of the method embodiment shown in FIG. 3.

According to the second transmission device 160 shown in FIG. 16, the first transmission device configures each of different load subareas of a payload area of a FlexO frame to carry one client signal, and can flexibly configure, according to a requirement, a specific load subarea for carrying a specific client signal, thereby improving service transmission flexibility.

Figure 17:
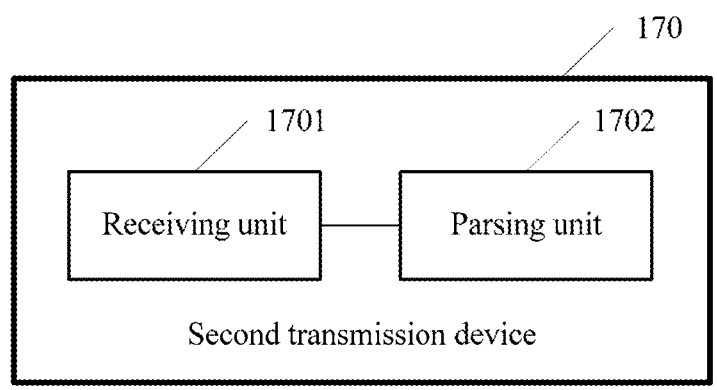
FIG. 17 is a schematic structural diagram of another second transmission device according to an embodiment of the present invention.

Referring to FIG. 17, FIG. 17 is a schematic structural diagram of another second transmission device 170 according to an embodiment of the present invention. The second transmission device 170 includes a receiving unit 1701 and a parsing unit 1702. The receiving unit 1701 and the parsing unit 1702 are described in detail below:

The receiving unit 1701 is configured to receive m lanes of FlexO frames sent by a first transmission device by using m FlexO lanes with a transmission rate of s, where each of the m lanes of FlexO frames includes a client signal, FlexO type information, timeslot overhead information, and signal mapping information, where n client signals with a rate of t are mapped to the m lanes of FlexO frames, a payload area of each of the m lanes of FlexO frames is divided into s/t load subareas, and each client signal is mapped to one load subarea; the FlexO type information is used to indicate a FlexO group interface type, and the FlexO group interface type indicates a transmission rate of a FlexO lane for transmitting each lane of FlexO frame and indicates that the payload area of each lane of FlexO frame is divided into the s/t load subareas; the timeslot overhead information is used to indicate client signals mapped to the s/t load subareas of each lane of FlexO frame; and the signal mapping information is used to indicate distribution, in each load subarea, of a client signal carried in each of the s/t load subareas of each lane of FlexO frame, where s, t, m, and s/t are all positive integers.

The parsing unit 1702 is configured to parse, according to the FlexO type information, the timeslot overhead information, and the signal mapping information, the client signals carried in the ms/t load subareas.

By running the foregoing units, the first transmission device configures each of different load subareas of a payload area of a FlexO frame to carry one client signal, and can flexibly configure, according to a requirement, a specific load subarea for carrying a specific client signal, thereby improving service transmission flexibility.

In an optional solution, when n<ms/t, a replacement signal is filled in a load subarea that is in the ms/t load subareas and to which no client signal is mapped.

In another optional solution, the n client signals with the rate of t include client signals in at least two optical channel transport units, and each optical channel transport unit includes at least one client signal.

In still another optional solution, s/t>2, each lane of FlexO frame includes a first load subarea and a second load subarea, and client signals in different optical channel transport units in the at least two optical channel transport units are separately mapped to a first load subarea and a second load subarea of at least one of the m lanes of FlexO frames.

In yet another optional solution, the timeslot overhead information is further used to indicate an optical channel transport unit to which the client signals mapped to the s/t load subareas of each lane of FlexO frame belong.

It should be noted that, for specific implementation of the second transmission device 170 shown in FIG. 17, reference can be made to the corresponding implementation of the method embodiment shown in FIG. 3.

According to the second transmission device 170 shown in FIG. 17, the first transmission device configures each of different load subareas of a payload area of a FlexO frame to carry one client signal, and can flexibly configure, according to a requirement, a specific load subarea for carrying a specific client signal, thereby improving service transmission flexibility.

Figure 18:
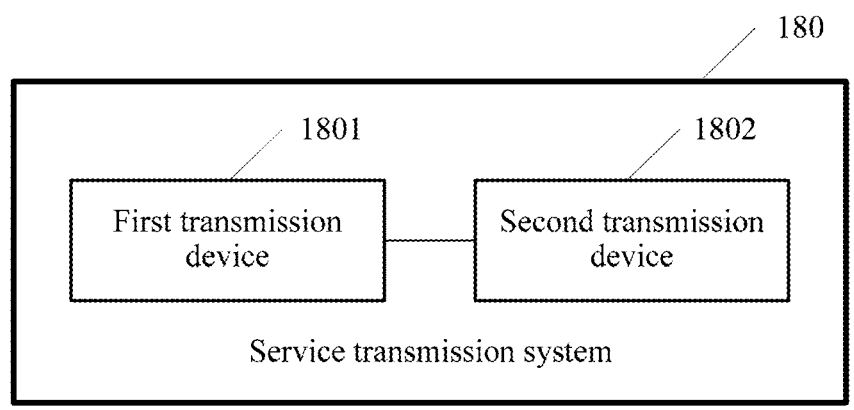
FIG. 18 is a schematic structural diagram of a service transmission system according to an embodiment of the present invention.

Referring to FIG. 18, FIG. 18 is a schematic structural diagram of a service transmission system 180 according to an embodiment of the present invention. The system 180 includes a first transmission device 1801 and a second transmission device 1802. The first transmission device 1801 is the first transmission device 140 described in FIG. 14 or the first transmission device 150 described in FIG. 15. The second transmission device 1802 is the second transmission device 160 described in FIG. 16 or the second transmission device 170 shown in FIG. 17.

In conclusion, according to this embodiment of the present invention, the first transmission device configures each of different load subareas of a payload area of a FlexO frame to carry one client signal, and can flexibly configure, according to a requirement, a specific load subarea for carrying a specific client signal, thereby improving service transmission flexibility.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:
1. A service transmission method, comprising:
 mapping, by a transmission device, n client signals with a rate of t to ms/t load subareas of m lanes of flexible optical transport network (FlexO) frames, wherein each client signal is mapped to one load subarea, a payload area of each of the m lanes of FlexO frames is divided into s/t load subareas, and each lane of FlexO frame is transmitted by using a FlexO lane with a transmission rate of s, wherein s, t, m, and s/t are all positive integers;
 configuring, by the transmission device, signal mapping information for each lane of FlexO frame, wherein:
 the signal mapping information indicates distribution, in each load subarea, of a client signal carried in each of the s/t load subareas of each lane of FlexO frame; and
 transmitting, by the transmission device, the m lanes of FlexO frames to another transmission device by using m FlexO lanes with the transmission rate of s.
2. The method according to claim 1, wherein the client signals carried in the ms/t load subareas are parsed by the another transmission device according to FlexO type information, timeslot overhead information, and the signal mapping information.

3. The method according to claim 1, wherein the method further comprises:
in response to determining n<ms/t, filling a replacement signal in a load subarea that is in the ms/t load subareas and to which no client signal is mapped.

4. The method according to claim 2, wherein the method further comprises:
in response to determining n<ms/t, filling a replacement signal in a load subarea that is in the ms/t load subareas and to which no client signal is mapped.

5. The method according to claim 1, wherein the n client signals with the rate of t comprise client signals in at least two optical channel transport units, and each optical channel transport unit comprises at least one client signal.

6. The method according to claim 5, wherein s/t>2, each lane of FlexO frame comprises a first load subarea and a second load subarea, and client signals in different optical channel transport units in the at least two optical channel transport units are separately mapped to a first load subarea and a second load subarea of at least one of the m lanes of FlexO frames.

7. The method according to claim 5, wherein the timeslot overhead information further indicates an optical channel transport unit to which the client signals mapped to the s/t load subareas of each lane of FlexO frame belong.

8. The method according to claim 1, wherein before the transmitting, by the transmission device, the m lanes of FlexO frames to the another transmission device by using m FlexO lanes with the transmission rate of s, the method further comprises:
configuring, by the transmission device, quantity overhead information for each lane of FlexO frame, wherein the quantity overhead information indicates a quantity of load subareas that are in the load subareas of each lane of FlexO frame and to which client signals are mapped.

9. A first transmission device, wherein the first transmission device comprises
at least one processor; and
a non-transitory computer-readable storage medium coupled to the at least one processor and storing programming instructions for execution by the at least one processor, wherein the programming instructions instruct the at least one processor to perform operations comprising:
mapping n client signals with a rate of t to ms/t load subareas of m lanes of flexible optical transport network (FlexO) frames, wherein each client signal is mapped to one load subarea, a payload area of each of the m lanes of FlexO frames is divided into s/t load subareas, and each lane of FlexO frame is transmitted by using a FlexO lane with a transmission rate of s, wherein s, t, m, and s/t are all positive integers;
configuring signal mapping information for each lane of FlexO frame, wherein:
the signal mapping information indicates distribution, in each load subarea, of a client signal carried in each of the s/t load subareas of each lane of FlexO frame; and
transmitting the m lanes of FlexO frames to another transmission device by using m FlexO lanes with the transmission rate of s.

10. The transmission device according to claim 9, wherein the client signals carried in the ms/t load subareas is parsed by the another transmission device according to FlexO type information, timeslot overhead information, and the signal mapping information.

11. The transmission device according to claim 9, wherein the operations comprise: in response to determining n<ms/t, filling a replacement signal in a load subarea that is in the ms/t load subareas and to which no client signal is mapped.

12. The transmission device according to claim 10, wherein the operations comprise: in response to determining n<ms/t, filling a replacement signal in a load subarea that is in the ms/t load subareas and to which no client signal is mapped.

13. The transmission device according to claim 9, wherein the n client signals with the rate of t comprise client signals in at least two optical channel transport units, and each optical channel transport unit comprises at least one client signal.

14. The transmission device according to claim 13, wherein s/t>2, each lane of FlexO frame comprises a first load subarea and a second load subarea, and client signals in different optical channel transport units in the at least two optical channel transport units are separately mapped to a first load subarea and a second load subarea of at least one of the m lanes of FlexO frames.

15. The transmission device according to claim 13, wherein the operations comprises configuring timeslot overhead information, and wherein the timeslot overhead information indicates client signals mapped to the s/t load subareas of each lane of FlexO frame and further indicates an optical channel transport unit to which the client signals mapped to the s/t load subareas of each lane of FlexO frame belong.

16. The transmission device according to claim 9, wherein before the transmitting the m lanes of FlexO frames to the another transmission device by using m FlexO lanes with the transmission rate of s and by using a line board, the operations comprise:
configuring quantity overhead information for each lane of FlexO frame, wherein the quantity overhead information indicates a quantity of load subareas that are in the load subareas of each lane of FlexO frame and to which client signals are mapped.

17. The transmission device according to claim 10, wherein before the transmitting the m lanes of FlexO frames to the another transmission device by using m FlexO lanes with the transmission rate of s and by using a line board, the operations comprise:
configuring quantity overhead information for each lane of FlexO frame, wherein the quantity overhead information indicates a quantity of load subareas that are in the load subareas of each lane of FlexO frame and to which client signals are mapped.

18. The method according to claim 2, wherein the n client signals with the rate of t comprise client signals in at least two optical channel transport units, and each optical channel transport unit comprises at least one client signal.

19. The method according to claim 1, wherein the configuring further comprising:
configuring, by the transmission device, FlexO type information and timeslot overhead information and for each lane of FlexO frame, wherein:
the FlexO type information indicates a FlexO group interface type, and the FlexO group interface type indicates the transmission rate of the FlexO lane for transmitting each lane of FlexO frame and indicates that the payload area of each lane of FlexO frame is divided into the s/t load subareas; and the timeslot overhead information indicates client signals mapped to the s/t load subareas of each lane of FlexO frame.

20. The transmission device according to claim 9, wherein the operations further comprise:
configuring FlexO type information and timeslot overhead information for each lane of FlexO frame, wherein:
the FlexO type information indicates a FlexO group interface type, and the FlexO group interface type indicates the transmission rate of the FlexO lane for transmitting each lane of FlexO frame and indicates that the payload area of each lane of FlexO frame is divided into the s/t load subareas; and
the timeslot overhead information indicates client signals mapped to the s/t load subareas of each lane of FlexO frame.

* * * * *

UNITED STATES PATENT AND TRADEMARK OFFICE
CERTIFICATE OF CORRECTION

PATENT NO. : 10,623,836 B2
APPLICATION NO. : 16/200922
DATED : April 14, 2020
INVENTOR(S) : Wei Su and Qiuyou Wu Page 1 of 1

It is certified that error appears in the above-identified patent and that said Letters Patent is hereby corrected as shown below:

In the Claims

In Column 20, Line 51, in Claim 1, delete "oft" and insert -- of t --, therefor.

In Column 21, Line 41, in Claim 9, after "A" delete "first".

In Column 21, Line 41, in Claim 9, after "the" delete "first".

In Column 21, Line 50, in Claim 9, delete "oft" and insert -- of t --, therefor.

In Column 22, Line 14, in Claim 13, delete "oft" and insert -- of t --, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*